United States Patent
Wittmann et al.

(10) Patent No.: US 7,912,810 B2
(45) Date of Patent: Mar. 22, 2011

(54) METHODS, SYSTEMS AND COMPUTER PROGRAM PRODUCTS FOR INTEGRATING CARRIER SERVICES INTO AN ENTERPRISE

(75) Inventors: Barbara Wittmann, St. Leon-Rot (DE); Heinz Kagermann, Leimen (DE); Christiane Kuntz-Mayr, Limburgerhof (DE); Suresh Babu, Los Altos, CA (US)

(73) Assignee: SAP AG, Walldorf (DE)

( * ) Notice: Subject to any disclaimer, the term of this patent is extended or adjusted under 35 U.S.C. 154(b) by 208 days.

(21) Appl. No.: 11/399,411

(22) Filed: Apr. 7, 2006

(65) Prior Publication Data

US 2006/0293911 A1  Dec. 28, 2006

Related U.S. Application Data

(60) Provisional application No. 60/695,150, filed on Jun. 28, 2005.

(51) Int. Cl.
  G06F 7/00 (2006.01)
  G06F 17/00 (2006.01)
  G06F 17/30 (2006.01)
  G06Q 10/00 (2006.01)

(52) U.S. Cl. .......... 707/607; 707/706; 707/694; 705/1.1

(58) Field of Classification Search .............. 707/10, 707/104.1, 706, 694, 607; 705/1, 1.1
See application file for complete search history.

(56) References Cited

U.S. PATENT DOCUMENTS

| 5,758,329 | A | 5/1998 | Wojcik et al. |
| 7,533,050 | B2 | 5/2009 | Shamrakov |
| 7,647,233 | B2 * | 1/2010 | Kadaba et al. ............ 705/1 |
| 7,653,586 | B2 * | 1/2010 | Laurent et al. ............ 705/37 |
| 2002/0049622 | A1 * | 4/2002 | Lettich et al. ............ 705/7 |
| 2002/0138316 | A1 * | 9/2002 | Katz et al. ............ 705/7 |
| 2002/0152133 | A1 * | 10/2002 | King et al. ............ 705/26 |
| 2003/0028451 | A1 * | 2/2003 | Ananian ............ 705/27 |
| 2003/0069774 | A1 | 4/2003 | Hoffman et al. |
| 2003/0084125 | A1 | 5/2003 | Nagda et al. |
| 2003/0182392 | A1 * | 9/2003 | Kramer ............ 709/217 |

(Continued)

FOREIGN PATENT DOCUMENTS

WO  WO 2004/111902 A2  12/2004

OTHER PUBLICATIONS

Communication and Search Report from the European Patent Office, dated May 29, 2007 for Application No./Patent No. 06027005.5-1238 (7 pages).

(Continued)

*Primary Examiner* — Charles E Lu
(74) *Attorney, Agent, or Firm* — Finnegan, Henderson, Farabow, Garrett & Dunner, LLP

(57) ABSTRACT

Systems, methods and computer readable media are provided for integrating carrier services. In one implementation, carrier services are integrated into an Enterprise Resource Planning (ERP) system utilizing an integration platform. The integration platform may include a first, second, and third components. The first, second, and third components may interact to utilize within the integration platform services offered by ERP vendors and carriers by discovering, setting up, testing, running and updating these services. As result, typical business scenarios, such as a order-to-cash process, may be enhanced.

17 Claims, 12 Drawing Sheets

U.S. PATENT DOCUMENTS

| | | | |
|---|---|---|---|
| 2004/0006610 | A1 | 1/2004 | Anagol-Subbarao et al. |
| 2004/0010496 | A1 | 1/2004 | Behrendt et al. |
| 2004/0064351 | A1 | 4/2004 | Mikurak |
| 2004/0215480 | A1* | 10/2004 | Kadaba .......................... 705/1 |
| 2005/0044197 | A1 | 2/2005 | Lai |
| 2005/0086102 | A1* | 4/2005 | Harrison et al. ................ 705/14 |
| 2005/0209913 | A1* | 9/2005 | Wied et al. ...................... 705/12 |
| 2006/0074729 | A1 | 4/2006 | Capotosto et al. |
| 2006/0293938 | A1 | 12/2006 | Wittmann et al. |

OTHER PUBLICATIONS

Liang-Jie Zhang et al., "A Manageable Web Services Hub Framework and Enabling Technologies for E-Sourcing," IEEE 2002 International Conference on Systems, Man, and Cybernetics, Oct. 6-9, 2002, vol. 6, pp. 163-168, New York, NY.

M. Chen et al., "Empowering Collaborative Commerce with Web Services Enabled Business Process Management Systems," Decision Support Systems, Elsevier Science, vol. 43, No. 2, Jul. 2005, pp. 530-546.

A. Raut et al., "Enterprise Business Process Integration," IEEE TENCON 2003, Conference on Convergent Technologies for the Asia-Pacific Region, vol. 4, Oct. 15-17, 2003, New York, NY, pp. 1549-1553.

K. Kontogiannis et al., "On the Role of Services in Enterprise Application Integration," Proceedings of the 10$^{th}$ International Workshop on Software Technology and Engineering Practice, (Step'02), Oct. 6-8, 2002, Piscataway, NJ, pp. 103-113.

S. Damodaran, "B2B Integration Over the Internet with XML-RosettaNet Successes and Challenges," May 17-22, 2004, New York, NY, pp. 188-195.

Communication and Search Report from the European Patent Office, dated Jul. 18, 2008 for Application No./Patent No. 06027004.8-1225/1811405 (8 pages).

Office Action issued on Aug. 28, 2009 in U.S. Appl. No. 11/399,412 (25 pages).

Final Office Action issued on Jan. 21, 2010 in U.S. Appl. No. 11/399,412 (25 pages).

* cited by examiner

|  | Pre - Shipping | Shipping | Post - Shipping |
|---|---|---|---|
| Core - Shipping Services | | | |
| Carrier Selection | ✓ | | |
| Address Validation | ✓ | | |
| Global Trade Services | | ✓ | |
| Track & Trace | | ✓ | ✓ |
| Settlement | | | ✓ |
| Returns Management | ✓ | | ✓ |
| Exception Management | | ✓ | ✓ |
| Express Carrier Services | | | |
| Rate Selection | ✓ | ✓ | |
| Service Selection | ✓ | ✓ | |
| Route Determination | ✓ | ✓ | |
| Labeling | | ✓ | |
| Manipulating | | ✓ | |
| Ocean Carrier Services | | | |
| Booking Request | ✓ | | |
| Booking Confirmation | ✓ | | |
| Shipping Instructions | | ✓ | |
| Billing of Lading | | ✓ | |

FIG. 1

METHODS, SYSTEMS AND COMPUTER PROGRAM PRODUCTS FOR INTEGRATING CARRIER SERVICES INTO AN ENTERPRISE

CROSS-REFERENCE TO RELATED APPLICATION(S)

This application claims the benefit of priority from U.S. Provisional Application No. 60/695,150, entitled "Methods and Systems for Carrier Selection," filed on Jun. 28, 2005, and PCT International Application No. PCT/US05/47214, filed on Dec. 30, 2005, the disclosures of which are expressly incorporated herein by reference to its entirety.

TECHNICAL FIELD

The present invention generally relates to the field of enterprise resource planning and management. More specifically, the invention relates to methods, systems and computer program products for integrating carrier services with a planning system of an enterprise, such as an enterprise resource planning (ERP) system.

BACKGROUND INFORMATION

Parcel shipping has grown to become an important mode of transportation and the industry continues to grow as enterprises and other shippers seek an increasing range of services from carriers to fulfill market requirements. By way of example, enterprises seek carriers that are able to integrate their transportation planning and execution processes, implement business rules easily, manage their business processes in exception mode(s), track their shipping execution, and complete the loop with easy financial settlement. In addition, carriers are attempting to distinguish themselves by offering a wide array of value added services, such as track & trace features and address validation.

Current ERP systems have only a limited capability to integrate with the carrier offerings, as well as fulfill the market requirements listed above. In general, ERP systems are integrated information systems that help enterprises better control their assets and business processes by creating adaptive systems that improve internal and external operations and enhance collaboration with constituents, customers, and suppliers. One example of an ERP system is the mySAP™ ERP solution provided by SAP AG of Walldorf, Germany.

An ERP system may comprise individual modules or software applications that provide support of enterprise key areas, such as financial management, human capital management, product development and manufacturing, and sales and service. As these modules are enterprise wide, to improve efficiency of operation and integration of these modules, an ERP system may utilize a Service-Oriented Architecture (SOA). SOA refers to a software architectural concept that encourages the creation of loosely coupled services that communicate and pass information between the modules. Specific examples of these loosely coupled services are Web services.

A Web service represents a self-contained, self-describing piece of application functionality that can be found and accessed by other applications using open standards. A Web service is self-contained, because the application using the Web service does not have to depend on anything other than the service itself, and self-describing, because all the information on how to use the service may be obtained from the service itself. The descriptions are centrally stored and accessible through Web-standards-based mechanisms to all applications that would like to invoke the service. Individual Web services may be further aggregated together to compose enterprise services. Enterprise services, as opposed to individual Web services, which are granular in nature, provide more meaningful building blocks for the task of automating enterprise-scale business scenarios. An enterprise-scale business scenario is a collection of related process steps that produce a specific outcome for a particular customer.

For example, a typical enterprise-scale business scenario is the order-to-cash process. An ERP system may include modules for each order-to-cash process step, such as sales order, billing, delivery, picking/packing, shipment, and invoice. Although carriers do offer a wide range of software products to support the above process steps, present ERP systems lack the ability to provide true integration of these software products. Rather, a carrier's complete service portfolio may only be accessed by an enterprise through a manual call of the carrier's website. For example, in the order-to-cash process, many carriers offer an address validation software product. Address validation ensures that customer entered shipping addresses are correct at the time of order processing. However, instead of fully integrating such carrier services, present ERP systems may only provide limited possibilities to store, for example, carrier rates and services for specific routing codes within data tables. Further, because of market factors such as fuel charges, rates are fairly dynamic. In addition, as the transportation market becomes more and more competitive, carriers have been forced to expand their service offerings on an on-going basis. The underlying result is that customers are forced to manually update these tables, or program their own update mechanisms.

The inability to integrate the service portfolio fully into an enterprise's systems limits the competitive position of many carriers. Further, manual corrections at the distribution center of the carrier resulting from old documentation or incorrect data at the enterprise, adds a lot of additional cost and jeopardizes the timely parcel delivery. Thus, as the carrier and enterprise solutions are non-integrated, the process of updating, testing, and integrating new carrier products is very time consuming and cumbersome. To react quickly to changes in the shipping markets, carriers and enterprises need a solution that will enable them to react instantly to market demands and a solution that offers easier update and integration mechanisms.

Accordingly, there is a need for a solution that integrates carrier services with the services and/or processes of an enterprise. For example, it would be beneficial to provide an integration platform that could eliminate cumbersome manual table entries and customizing. With this type of service-oriented solution, enterprises would be able to combine enterprise services with carrier services to facilitate end-to-end business processes to execute their transportation needs through carriers. Further, it would be beneficial to provide a platform that enables a Web service call from, for example, several points in the order-to-cash process to, for example, directly send relevant parameters and receive the most up to date services available. Moreover, with an enhanced integration of carrier and shipper services, manual efforts and shipping errors could be minimized.

SUMMARY

In accordance with the principles of the present invention, as embodied and broadly described herein, methods, systems and computer program products are provided for integrating carrier services into an enterprise. The integration may be achieved through a platform that integrates the services of one or more carriers with the services and/or business processes of an enterprise. As further disclosed herein, an integration platform may be provided that integrates carrier services with an enterprise planning system, such as an ERP system.

According to one embodiment, a system is provided for integrating carrier services with an enterprise-scale business scenario that is supported by an enterprise resource planning (ERP) system of an enterprise. The system comprises a discovery component adapted to provide general Web services for facilitating the enterprise-scale business scenario and specific Web services of at least one vendor to aid the enterprise-scale business scenario; a connect component provided at least one of a plurality of vendors, adapted to publish specific Web services of the vendor to the discovery component; and an enterprise component deployed by the enterprise adapted to retrieve general and specific Web services provided by the discovery component, store the services in a configuration database, and plug the services into the enterprise-scale business scenario.

In another aspect of the invention, a method is disclosed of developing an integration platform for integrating carrier services with an enterprise-scale business scenario that is supported by an enterprise resource planning (ERP) system of an enterprise. The method comprises a discovery component adapted to provide general Web services for facilitating the enterprise-scale business scenario and specific Web services of at least one vendor to aid the enterprise-scale business scenario; a connect component provided at least one of a plurality of vendors, adapted to publish specific Web services of the vendor to the discovery component; and an enterprise component deployed by the enterprise adapted to retrieve general and specific Web services provided by the discovery component, store the services in a configuration database, and plug the services into the enterprise-scale business scenario.

In another aspect of the invention, a computer-readable medium including program instructions for performing, when executed by a processor, a method of developing an integration platform for integrating carrier services with an enterprise-scale business scenario that is supported by an enterprise resource planning (ERP) system of an enterprise. The method comprises a discovery component adapted to provide general Web services for facilitating the enterprise-scale business scenario and specific Web services of at least one vendor to aid the enterprise-scale business scenario; a connect component provided at least one of a plurality of vendors, adapted to publish specific Web services of the vendor to the discovery component; and an enterprise component deployed by the enterprise adapted to retrieve general and specific Web services provided by the discovery component, store the services in a configuration database, and plug the services into the enterprise-scale business scenario.

BRIEF DESCRIPTION OF THE DRAWINGS

The accompanying drawings show features of implementations consistent with the present invention and, together with the corresponding written description, help explain principles associated with the invention. In the drawings:

FIG. 1 is a table listing exemplary enterprise services in relation to a shipping process, consistent with an embodiment of the present invention;

DETAILED DESCRIPTION

Figure 2:
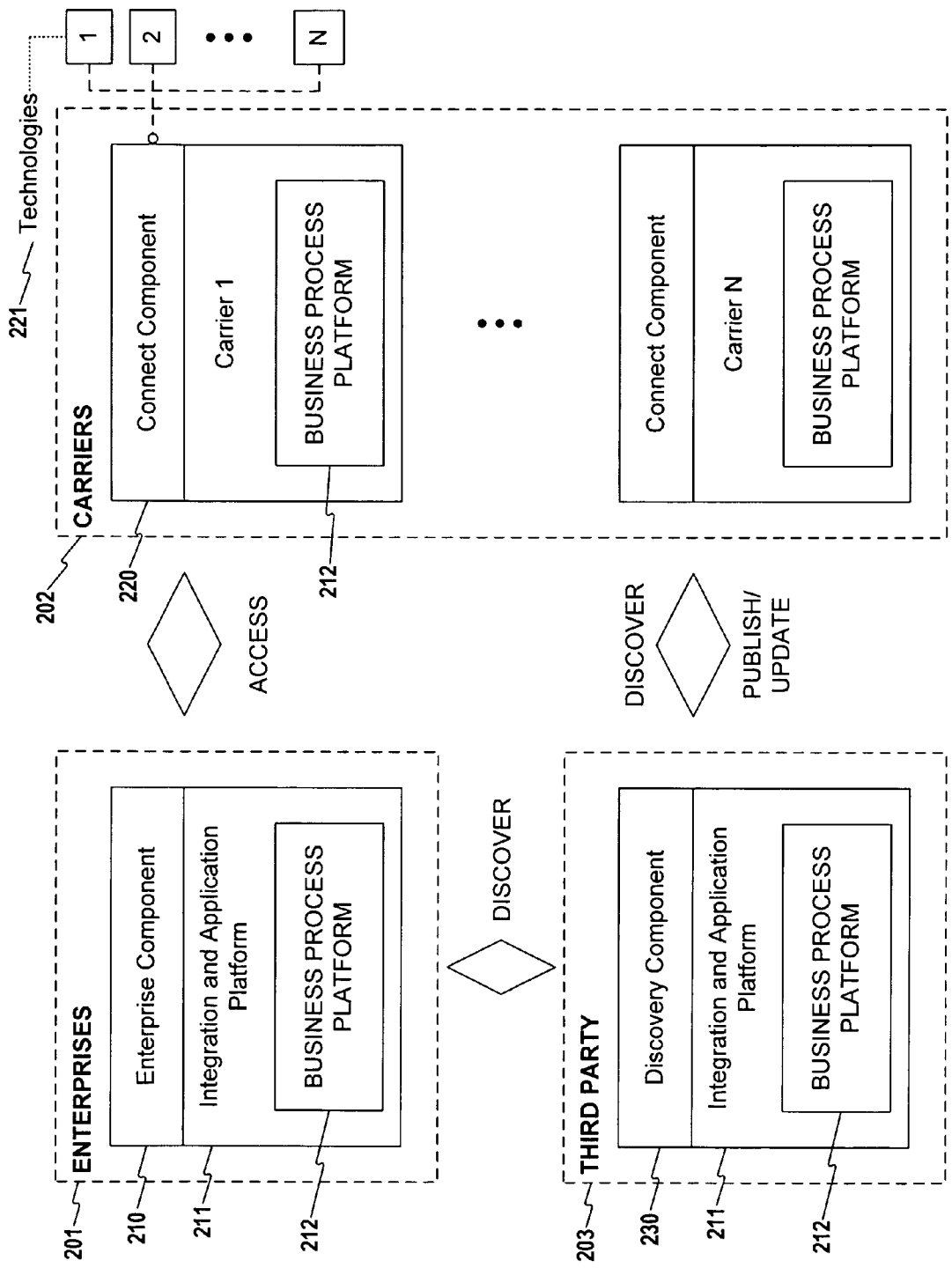
FIG. 2 illustrates a block diagram of an exemplary system architecture, consistent with an embodiment of the present invention.

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Overview

Methods, systems and computer readable media consistent with embodiments of the present invention provide for the integration of carrier services. As disclosed herein, the integration may be achieved with respect to an Enterprise Resource Planning (ERP) system. In accordance with one embodiment, an integration platform is provided. The integration platform may address a significant market, both in terms of growth and importance, the reach of which is not limited only to Parcel Shipping. The integration platform may also address all other key carrier segments, such as Ocean Cargo, Trucking, Air Cargo, Rail, etc., and thus be truly multi-modal in carrier enablement.

Integration platforms consistent with the present invention may be enabled to provide an Easy-To-Use and Self-Contained Carrier Enablement Solution based on the SOA environment to target the growing demand from enterprises for parcel and other carrier services. In one embodiment, the platform is service-oriented and enables enterprises to combine general Web services from a third party with specific Web services of a carrier to facilitate end-to-end business processes to execute their transportation needs through carriers.

Enabling carriers to utilize an enterprise's already existing ERP system to not only offer their services, but also to combine them with Web services available from other sources, is an attractive solution to enterprises who seek native parcel shipping capabilities from their enterprise software. Further, an SOA approach to executing shipping via carriers makes the platform modular, enabling enterprises of different sizes (e.g., large enterprises to small and medium businesses) to create a package of transportation execution services relevant to their needs.

An SOA approach is also beneficial since it makes it very easy for carriers to offer service packages to a wide customer base with disparate system infrastructure that would otherwise take a cumbersome and expensive integration process. Through the use of an integration platform consistent with the principles of the invention, enterprise customers can connect, for example, to Web services offered by carriers to check rates, routing and destinations, scheduled delivery, track shipments, print labels in the format required for that particular carrier, submit electronic manifests in the form required by the carrier, and settle payments electronically.

Integration platforms and embodiments consistent with the invention also facilitate the end-to-end flow of business information to carriers, that would otherwise be difficult to obtain or even simply unavailable. Updating rate and routing information or label formats becomes a simple matter of modifying the relevant Web services. For example, a particular carrier could be a preferred carrier for international shipping, and thus contracted rates and shipping information and other enterprise information would automatically be appended to shipments. Also, exception resolution (e.g., delays, changes, voids, returns, etc.) may be tracked and managed proactively rather than reactively.

For carriers, integration platforms consistent with the invention may enable standard enterprise services to be defined. These services may be delivered or aggregated from the different technologies that form a carrier's portfolio, insulating the shippers from changes in the carrier's technology strategy, which currently adds significant integration costs and service interruptions. Furthermore, each carrier may manage centrally the introduction of service modifications or new services. For example, the integration platform can make the task of disseminating rate changes, content changes, routing updates, etc., easy to manage. The ability to seamlessly integrate services into the business processes delivered by ERP systems also enables a carrier to focus on the business value delivered by its services and end-to-end process execution.

In summary, integration platforms consistent with the present invention may be architected to address current integration and synchronization challenges by providing, for example: seamless integration to carriers from any ERP system; the ability to discover, subscribe to, add or modify services provided by the ERP system vendor and carriers; and/or the ability to orchestrate business processes flexibly by integrating carrier services with ERP services offered in the ERP system.

Enterprise Services

As described above, Web services may represent the technical realization of the services used in an integration platform, and enterprise services may represent the aggregation of Web services. By way of example, FIG. 1 is a table listing exemplary enterprise services 170. The services are listed in relation to a shipping process and based upon the shipping services required.

In the example of FIG. 1, the enterprise services are separated into three different categories of services: core-shipping services 110, express carrier services 120, and ocean carrier services 130. The core-shipping services 110 describe the minimal necessary set of enterprise services between the shipper and carrier in connection with the integration platform to enable the shipping process. On the other hand, the express carrier services 120 and ocean carrier services 130 include enterprise services specialized to conduct express shipping and ocean shipping.

The enterprise services 170 may also be categorized or separated by the time of process execution. The major time periods in shipping may be defined as pre-shipping 140, shipping 150, and post-shipping 160. Within the pre-shipping time frame 140, all activities are bundled that happen before a package is ready to be shipped and thus, for example, the enterprise services of carrier selection and address validation would fall into this time period. Within the shipping time frame 150 all activities are bundled that happen when a package is shipped. This may include, for example, the enterprise services for global trade services and track & trace. Within the post-shipping time frame 160 all activities are bundled that happen after the package is shipped. This may include, for example, the enterprise services for settlement and returns management. Further, enterprise services such as the exception management, which is capable of handling problems that arise during the shipping process, may span all three time frames.

The enterprise services 170 presented in FIG. 1 are merely examples. Additional or other services may be provided or required. Further, after setup of the core enterprise services 170, such as those presented in the example of FIG. 1, additional enterprise services may be added to the integration platform as needed.

Exemplary System Architecture

FIG. 2 illustrates a block diagram of an exemplary system architecture 200. The integration platform architecture 200 comprises three major components: an enterprise component 210, a connect component 220, and a discovery component 230. These three components may be connected through the use of an integration broker that runs within an integration and application platform 211. An example of such an integration broker is the SAP Exchange Infrastructure (XI) component available from SAP AG of Walldorf, Germany. The XI component reduces integration and maintenance costs of IT systems by providing a common, central repository for interfaces. It offers an integrated tool set to help organizations build their own integration scenarios by defining the appropriate messaging interfaces, mappings, and routing rules.

In the exemplary embodiment of FIG. 2, the enterprise component 210 may run at an enterprise's site 201 and connect to an ERP system to provide enterprise services (such as enterprise services 170 presented in FIG. 1) for the shipping process. As illustrated, the enterprise component 210 comprises two main layers: an integration and application platform 211 and a business process platform 212. The integration and application platform 211 provides, through the business process platform 212, the foundation upon which modules that comprise the ERP system are run. For example, modules (see, e.g., ERP modules 520 illustrated in FIGS. 5 and 7) for each step in the order-to-cash process, such as sales order and carrier selection, select service rate, delivery, etc., run within the business process platform 212. Through a process known as orchestration and composition, all general Web services that are provided by a third party to enable shipping functionality, together with the specific Web services of arbitrary carriers, may be encapsulated as enterprise services 170. As used herein, the term "general web services" refers to Web services that relate to the generic operations of order-to-cash process. While, as used herein, the term "specific Web services" means Web services that are implemented by a carrier to execute services that are particular to that carrier, such as rate determination.

In the orchestration process, the enterprise plugs the Web service into the order-to-cash process and composes the enterprise service 170 that realizes the service call. As a prerequisite, a certain set of plug-in points has to be defined in the calling modules (such as ERP modules 520). For example, the enterprise services 170 may be plugged into the order-to-cash business process at well-defined points. Depending on the type and revision of the ERP system release, the availability of these plug-in points within the modules 520 may vary. However, the main plug-in points are sales order, delivery, shipment and packing. Other exemplary plug-in points may include select service rate and weigh goods compare with shipping order. As used herein, the term "compose" means the combination of Web service operation or Web service calls into one enterprise service 170. The composition definition is stored in a database table that is processed by a service and leads to the Web service calls as defined in the definition.

The connect component 220 may run at each carrier site 202 and connect each carrier's legacy environment to the enterprise component 210 that resides at the enterprise's site 201. The connect component 220 at a carrier provides a focal point for service delivery, service changes, distribution of updates and upgrades, maintenance, testing, and certification to customers utilizing the integration platform. Further, the connect component 220 enables a carrier to aggregate and standardize service delivery from across the multiple technologies 221 available at each carrier. The technologies 221 may comprise conventional technologies for providing carrier services via the web, including software and other applications.

The discovery component 230 may serve as a single point of information for shippers and carriers. Carriers may be found with this component and their services may be plugged into the integration platform enterprise component 210. Various approaches exist for implementing the discovery component 230. One approach is to have the discovery component 230 centralized and maintained by a third party other than the carrier or the enterprise. In one embodiment, a software developer such as the developer of the ERP system used by the enterprise is the entity responsible for maintaining the discovery component 230.

All three components 210, 220, 230 enable various cross-component processes, such as plug & play carrier enablement, carrier service discovery, automatic information and service updates and local and remote execution capabilities of carrier services. The three major components as well as the cross-component processes are described in further detail below.

Core Procedures

Figure 3:
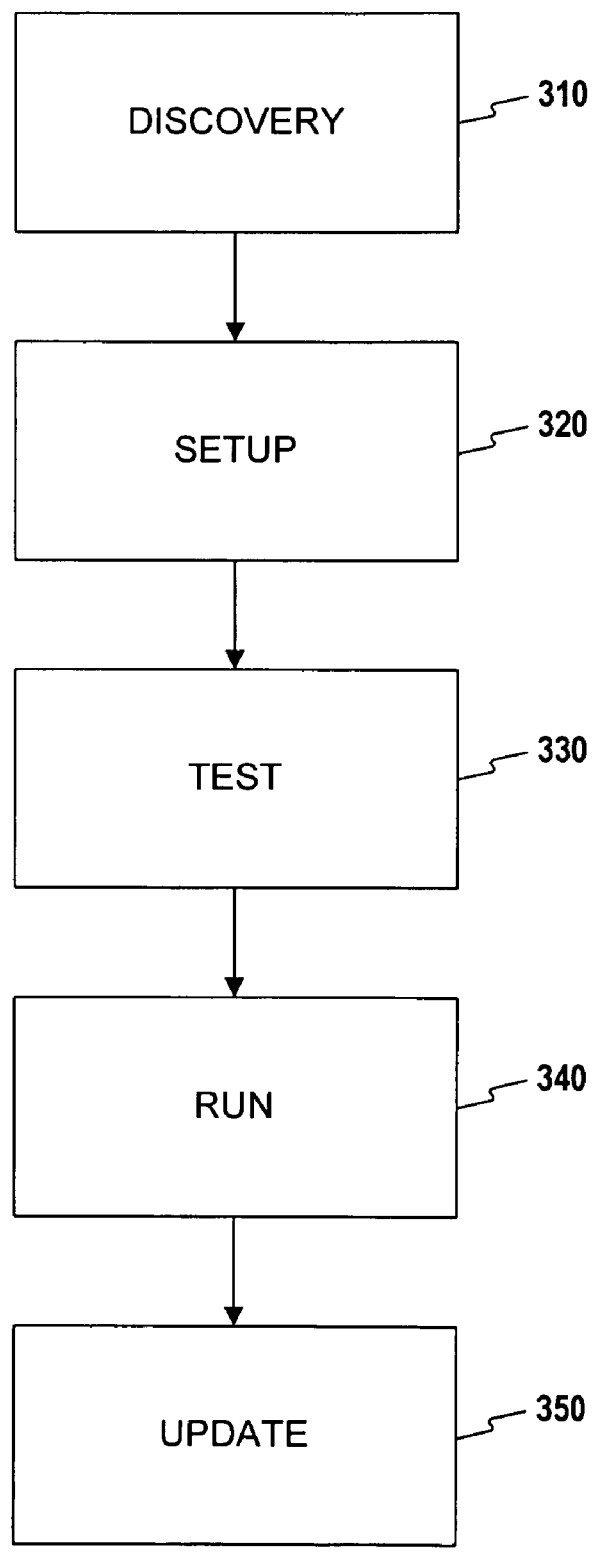
FIG. 3 is a flowchart of an exemplary method, consistent with an embodiment of the present invention.

FIG. 3 illustrates a flowchart of an exemplary method, consistent with an embodiment of the present invention. The exemplary method of FIG. 3 includes five core procedures that may be conducted by the integration platform. These core procedures provide the main functionality of the integration platform to enable efficient use of carrier services by enterprises. As the first two procedures (discovery 310 and setup 320) are closely related, they will be described together. In addition, both of these core procedures have two subtypes: carrier and service discovery (310), and carrier and service setup (320). Carrier discovery and carrier setup can be used for finding new carriers to execute shipping services and to setup the necessary contractual agreements to enable the enterprise component 210 to use the services. Service discovery and service setup are used to find Web services from a particular carrier and to orchestrate the enterprise's order-to-cash business process with these services.

Figure 4:
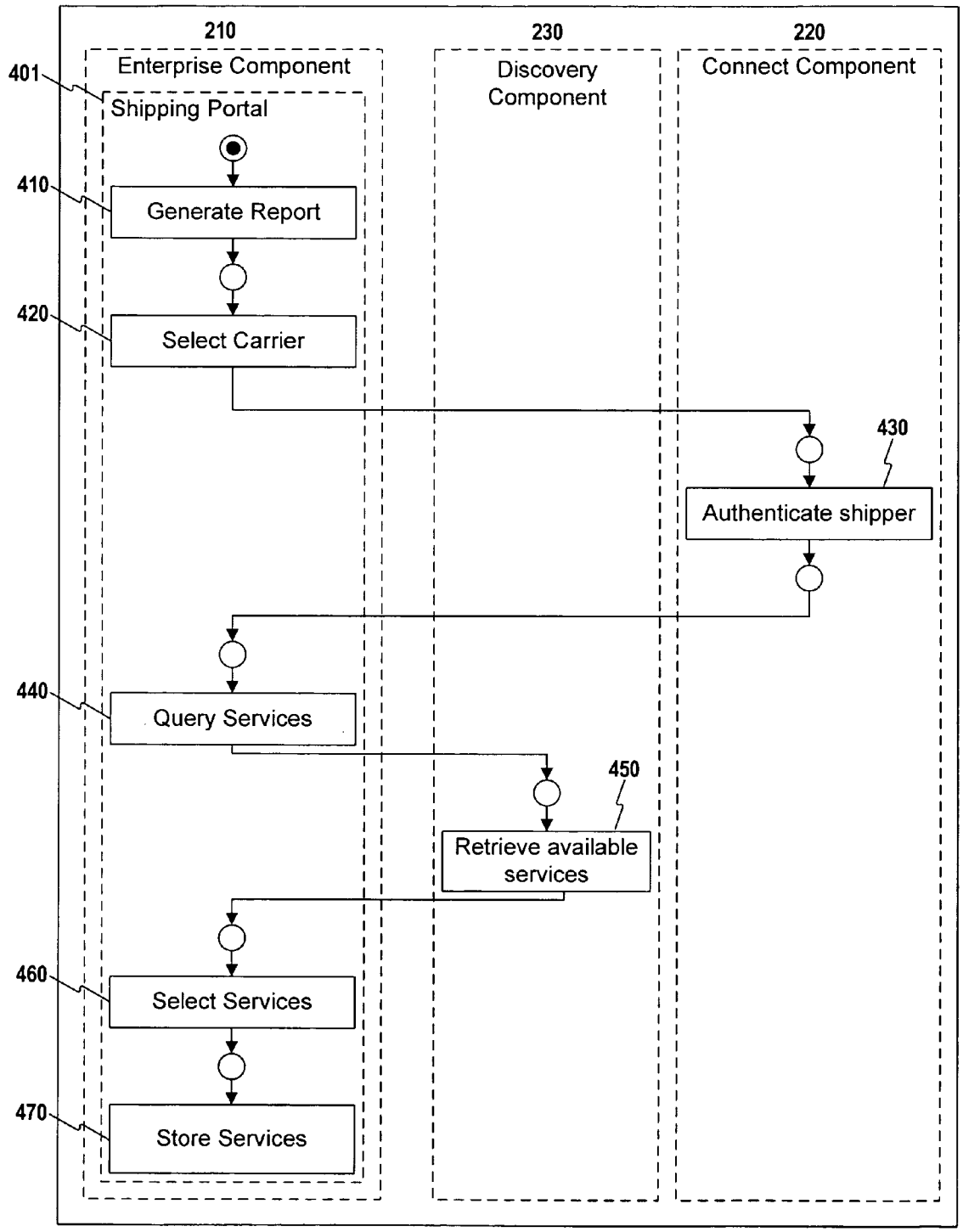
FIG. 4 illustrates a sequence diagram of an exemplary operation of the discovery procedure in FIG. 3, consistent with an embodiment of the present invention.
Figure 5:
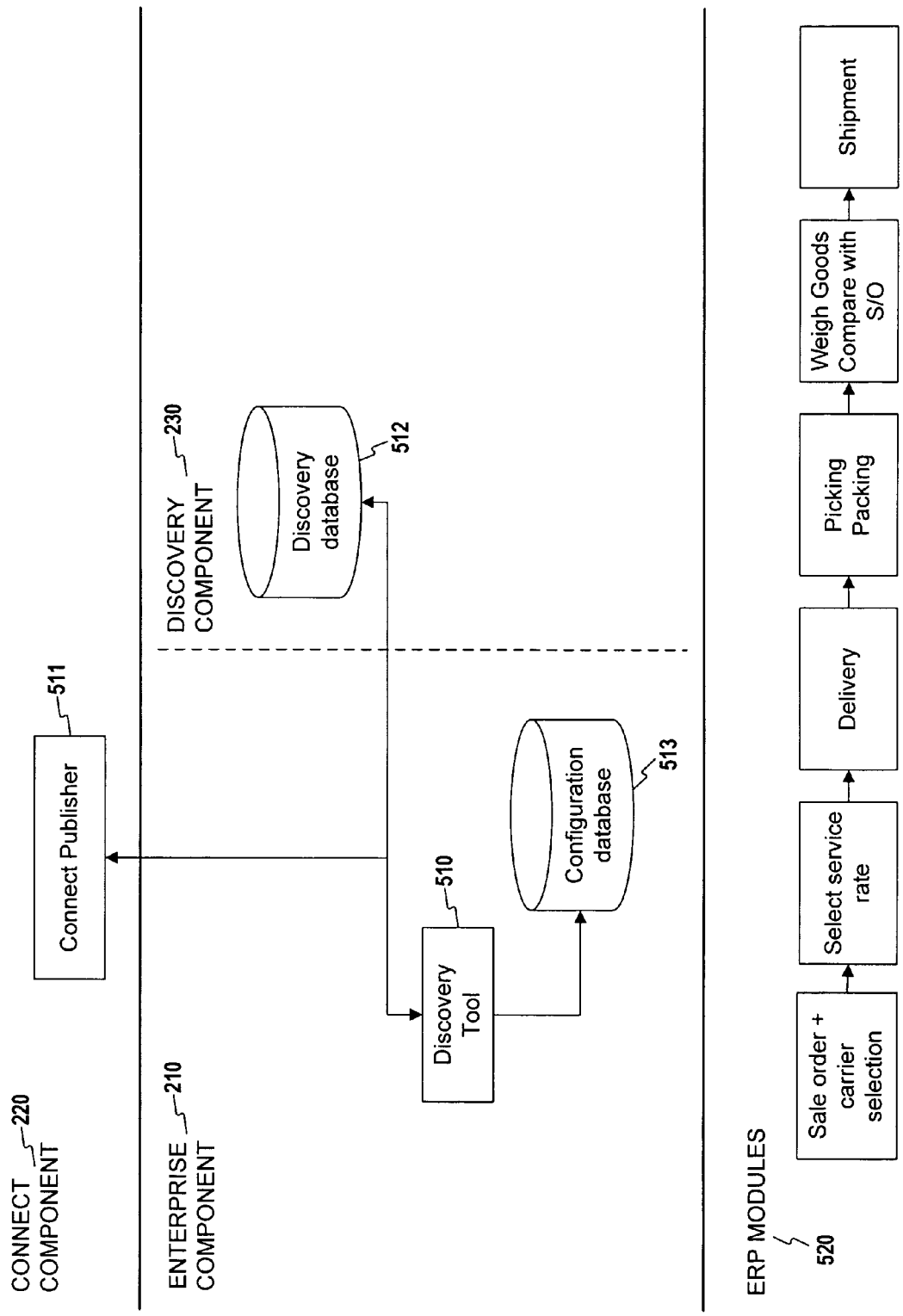
FIG. 5 illustrates a block diagram of exemplary elements and their interaction within the discovery procedure, consistent with an embodiment of the present invention.

In particular, in the discovery procedure 310, a shipping administrator may be supported for finding carriers and services that provide a particular functionality to enhance the shipping possibilities of the enterprise. FIG. 4 illustrates a sequence diagram of an exemplary operation of the discovery procedure 310 and FIG. 5 illustrates a block diagram of exemplary elements and their interaction within this procedure. Discussion of the discovery procedure will relate to both FIGS. 4 and 5.

The shipping portal 401 of the enterprise component 210 may handle the discovery procedure 310. The discovery procedure 310 begins by the initiation of the discovery tool 510 through the request of a user, such as a shipping administrator, to generate a report (step 410 in FIG. 4). The purpose of the report is to obtain an overview of individual carriers based on terms, such as freight volume, services provided and cost in a certain time frame as a starting point for new carrier negotiations. In a subsequent step (step 420), enabled by the enterprise component 210, the user may select a carrier from a list of carriers that are registered to the integration platform. In an exemplary embodiment, the carrier is registered through a contractual agreement outside of the processes of the integration platform. The contractual agreement may grant the enterprise log on data for online access to a carrier's services. The enterprise verifies the log on data by sending it to the connect component 220. Specifically, the data may be sent to the connect publisher 511, which authenticates the data and grants authorization. Authorization is necessary to ensure that the enterprise receives only the services that it has paid for (step 430).

The user may now enter different search criteria to discover the services that the selected carrier is capable of providing (step 440). For example, a user may enter information to query for delivery service to Canada, as well as address validation. The query is then sent from the enterprise component 210 to the discovery component 230, which retrieves the available services from the discovery database 512 (step 450). The discovery database 512 stores all services published by all carriers. However, the enterprise may only retrieve services published by the carrier for which it has logged on and for which it has been granted authorization. The user may then proceed to select (step 460) and save the relevant services in a configuration database 513 (step 470). Account and log on data, update intervals, and authorization rules are also saved in the configuration database 513.

Figure 6:
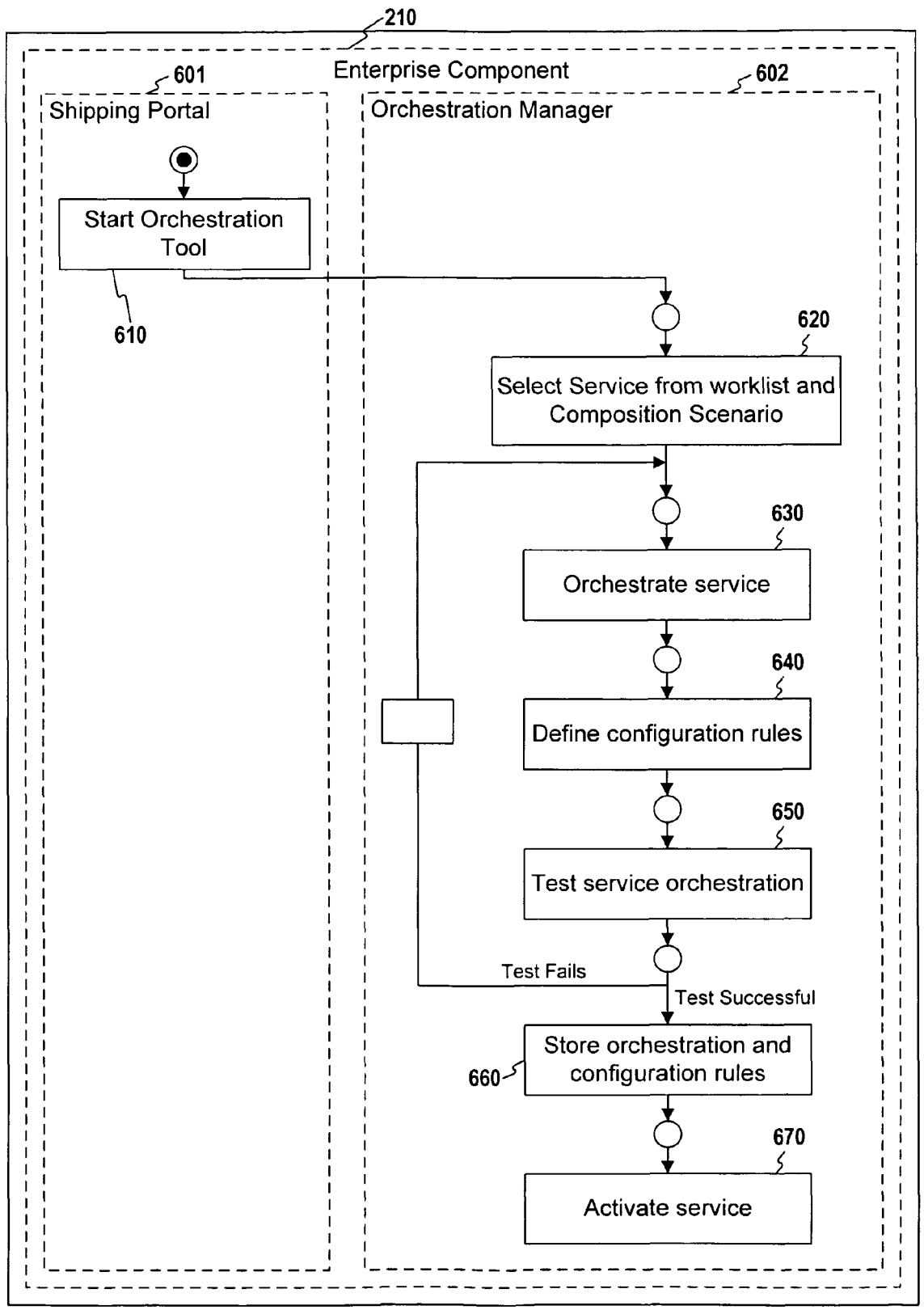
FIG. 6 illustrates a sequence diagram of an exemplary operation of the setup procedure of FIG. 3, consistent with an embodiment of the present invention.
Figure 7:
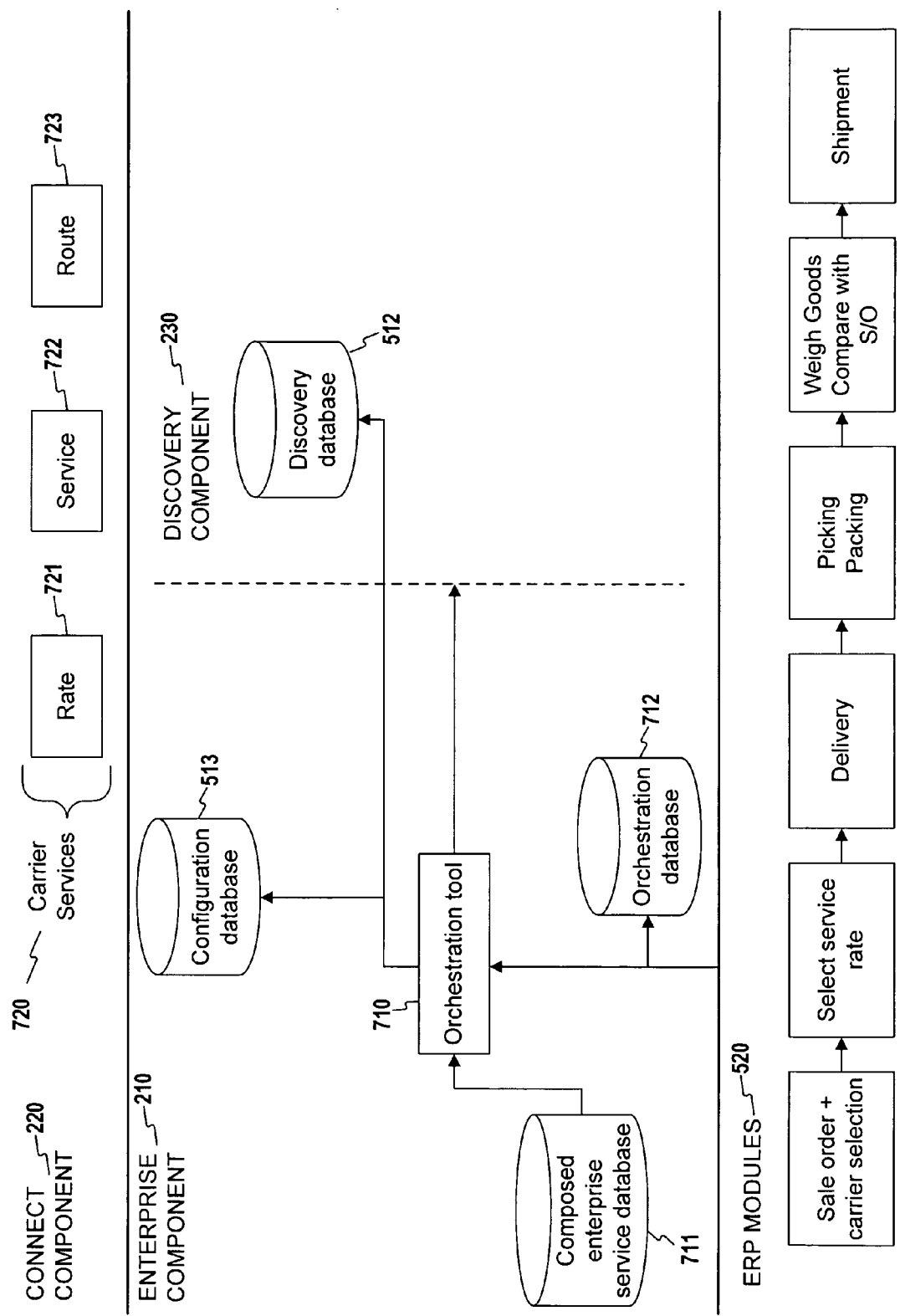
FIG. 7 illustrates a block diagram of exemplary elements and their interaction within the setup procedure, consistent with an embodiment of the present invention.

After appropriate carriers and services have been discovered, as part of the subsequent setup procedure 320 they have to be composed into enterprise services (if applicable), orchestrated, configured, and tested before being used during business process execution. FIG. 6 illustrates a sequence diagram of an exemplary operation of the setup procedure 320. FIG. 7 illustrates a block diagram of exemplary elements and their interaction within the procedure. The setup procedure 320 will be discussed in relation to both FIGS. 6 and 7.

In the service orchestration process, the enterprise plugs the services 720 offered by carriers into its internal business processes and composes the enterprise service that realizes the service call. The process begins by initiation of the orchestration tool 710 by an administrator from the shipping portal 401 (step 610). The administrator may then select a service from a worklist and composition scenario (step 620). The worklist may comprise all the services previously discovered and saved in the configuration database 513 during the discovery procedure 310. This step may also include the administrator checking whether there is an updated version of the service of the activated carrier in the discovery database 512. This ensures that the enterprise always uses the most current version of the services. The administrator may then select the service from the list that he wants to complete setup for. As the core enterprise services 170 will also offer several composition scenarios, the administrator may also select a scenario. For example, different scenarios occur as enterprise services 170 may be called from different activities of the standard order-to-cash business process executed at the enterprise. Furthermore, there are particular dependencies between some of the services. For instance, a routing code is required to calculate the rate, and the label may only be printed after the rate has been calculated. After the service, and if necessary the scenario is selected, the selected service is then connected to the system plug in points (step 630).

If a service has been found that may be plugged into a particular plug-in point of ERP system modules 520, the administrator composes the enterprise service 170 that is executed in the integration platform. Subsequently, the administrator may define the business rules for the composed enterprise service 170, such as the authorization required to use the service and the orchestrated process (step 640). A test is then preformed to ensure that the selected orchestration works/process logic is working before starting and activating the service (step 650). Unsuccessfully tested settings are reorchestrated. The successfully tested composition and orchestration settings are stored respectively, in a composition database 711 and an orchestration database 712. The administrator may then proceed to activation (step 660). The administrator may now activate the service, thus making the service now active within the enterprise environment and connected to the carrier (step 670).

Figure 8:
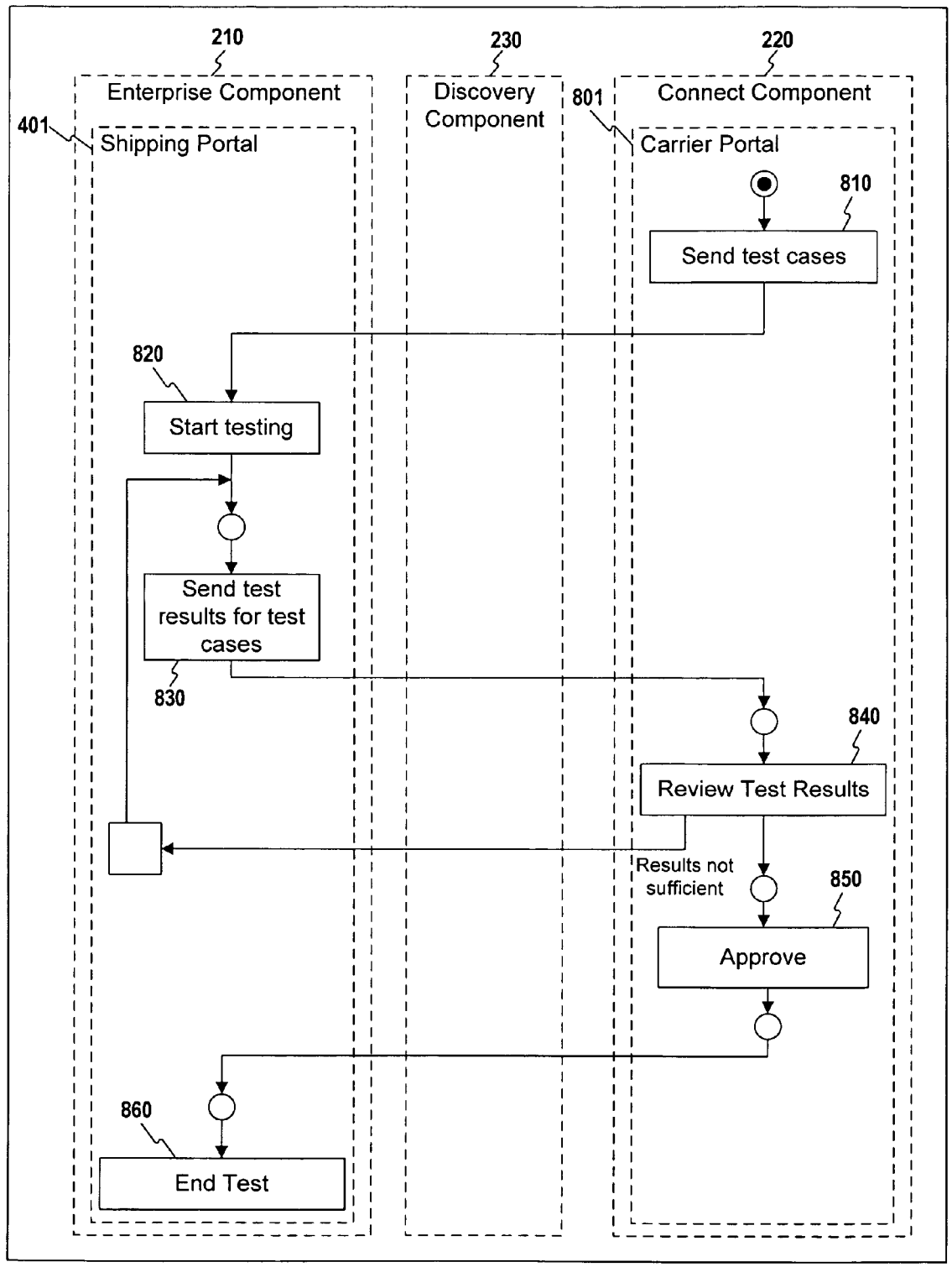
FIG. 8 illustrates a sequence diagram of an exemplary operation of the test core procedure of FIG. 3, consistent with an embodiment of the present invention.

FIG. 8 illustrates a sequence diagram of an exemplary operation of the test core procedure 320 as previously discussed in FIG. 3. During the test core procedure, the administrator verifies whether the service may be integrated into the order-to-cash business process. The test core procedure is used to test the orchestrated business process before it is used in production. In one embodiment, the test procedure may include three subtypes. The first, the compliance test, tests whether all release constraints for setting up and using the integration platform are fulfilled in the systems at the shipper. It may also check that the integration platform components at the enterprise and at the carrier have corresponding release levels. The second, the setup test, tests whether the logic of the orchestrated business process is correct, i.e., whether the enterprise services 170 are linked to the right plug in points and are called in the right order (see description of the orchestrating step 630 in FIG. 6). Third and finally, the run test, tests the service call to the carrier using test data provided by the carrier.

All three test subtypes may share the same basic structure. The test procedure begins by first sending test cases from the carrier portal 801 of the connect component 220 to the enterprise component 210 (step 810). The enterprise component 210 then starts the testing by working through the test cases and producing the necessary results (step 820). After the test results referring to the respective test cases are compiled, they are then sent back to the carrier (step 830). The carrier thereby reviews the test cases in light of the data quality for the test results (step 840). If the quality of those test results are not sufficient, another test sequence is requested. However, if the quality of the test results is sufficient, the test is approved (step 850). The test procedure ends when the shipper receives feedback from the carrier on the test results/data quality (step 860).

Figure 9:
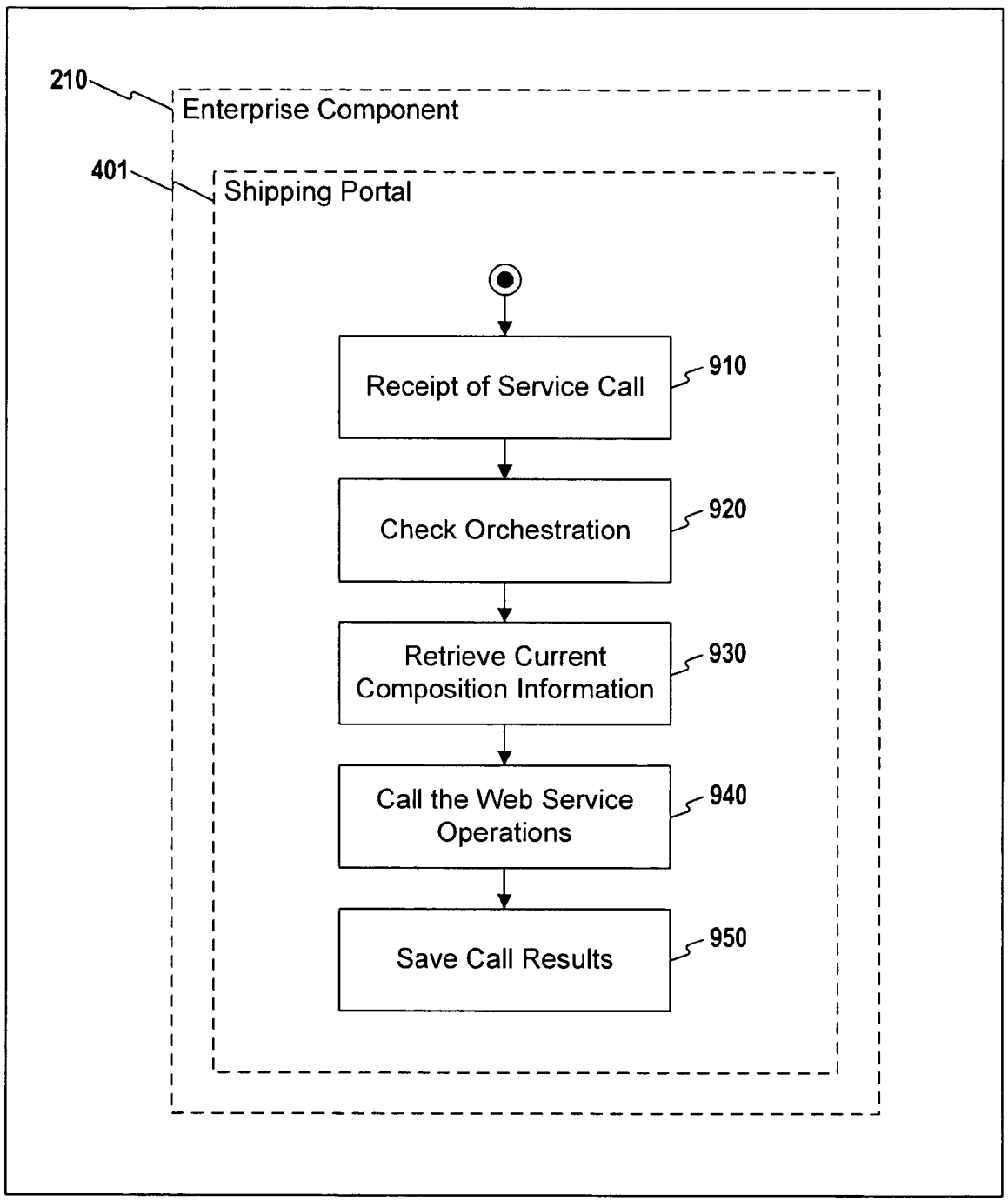
FIG. 9 illustrates a sequence diagram of an exemplary operation of the run procedure of FIG. 3, consistent with an embodiment of the present invention.
Figure 10:
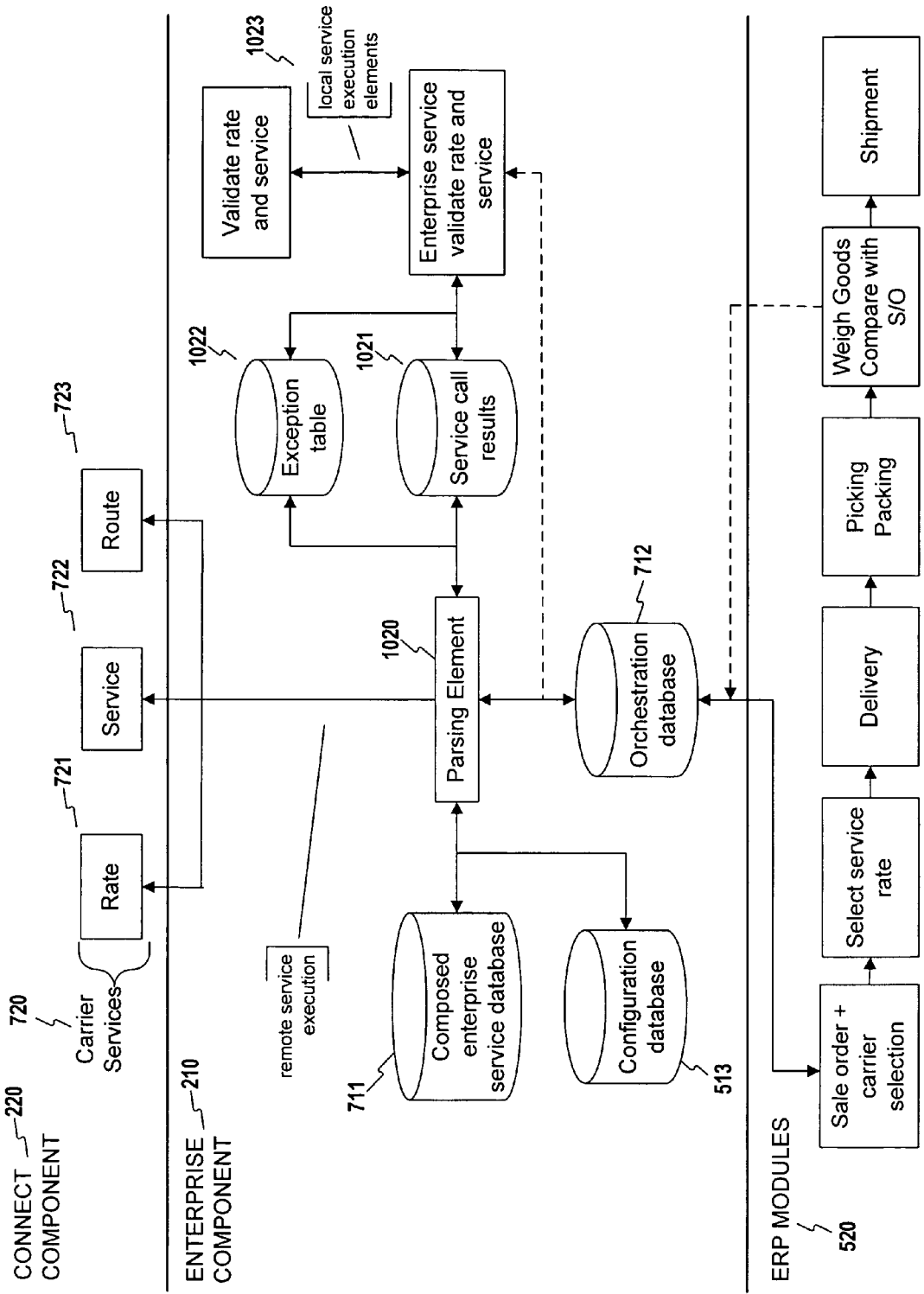
FIG. 10 illustrates a block diagram of exemplary elements and their interaction within the run procedure, consistent with an embodiment of the present invention.

FIG. 9 illustrates a sequence diagram of an exemplary overall execution of the run procedure 340 as previously discussed in FIG. 3. FIG. 10 illustrates a block diagram of exemplary elements and their interaction within the procedure. Discussion of the run procedure 340 will relate to both FIGS. 9 and 10. The run procedure 340 describes the execution of instances of the orchestrated shipper business process to handle a sales order and ship customer's goods. During the execution of the run procedure 340, operations of the enterprise services 170 that have been orchestrated are called. For example, the order-to-cash process will be integrated much tighter to the service offering of the carrier. As a result, data quality (e.g., correct rates/routing code) will go up and shipping error or additional charges by the carrier will go down to a minimum. Roles along the integration platform process (e.g., sales representative) will be able to view relevant shipping information without process breaks, since all relevant shipping information will be held on one information platform.

The execution of the run procedure 340 is initiated through the receipt, at the integration platform enterprise component 210, of an enterprise service call from an ERP system module 520 (step 910). When the enterprise component 210 receives the call, it first checks the orchestration database 712 to see whether a service call is orchestrated for this plug-in point (step 920). If the service call is orchestrated for this plug in point, the enterprise component 210 then retrieves current composition information for the enterprise service 170 from the composed enterprise service database 711 (step 930). Subsequently, the enterprise component 210 executes the enterprise service 170 by calling the appropriate Web service operation 720 (step 940). As an example, a simple call of the enterprise service for rate & route may provide the ERP system with the name of the carrier and the ship from and ship to address as specified by its interface description. The result of the call is dependent on the composition of the enterprise service. In the present illustrated example, the composition of the described enterprise service, as a maximum, could provide three different types of information: the rate at which the carrier services are available 721, the services that may be selected 722, and the routing code determined 723.

The messages, which may be implemented as XML, are defined in an integration broker repository (not illustrated) to allow easy replication to the plug-in point providing systems. Integration broker proxies are generated directly from this environment and the plug-in point uses the proxy class to interact with the enterprise component 210. The enterprise component 210 takes the message and determines dynamically the correct carrier's technical process end-points. This may be done in conjunction with the discovery component 230. Once the correct end-point is determined, the end-point Web service is called through the integration broker. The message is directly passed through to the services that are used to compose the complete enterprise service 170. The end-points of the Web service call reside in the connect component 220. Therefore, it is possible for a specific carrier to connect its environment to the connect component 220 of a particular carrier to retrieve the information needed from its backend environment.

As illustrated in the example of FIG. 10, the enterprise service description may be retrieved from the composed enterprise service database 711. The enterprise component 210 contains a parsing element 1020 that parses the enterprise service description and guides the service operation call to the appropriate service 720. The enterprise service may call local or remote services. Remote services are services executed at the carrier site 202. Local services are executed at the enterprise's site 201 using local service execution elements 1023. For local service, an instance of the connect component 220 is installed locally at the enterprise site 201. Thereby, the code for the service execution is executed locally by the connect component 220. To enable local execution of a Web service, the Web service has to fulfill some additional criteria. First, the algorithms have to be completely encapsulated in a Java package that is transferable to another server. Second, the database table descriptions have to be able to create the table physically on the enterprise's side. Third, the database table content has to be provided completely or has to be capable of being queried by another Web service found in the discovery component 230.

Results of the enterprise service execution, locally or remote, are stored in a service call results database 1021 and exceptions (i.e., a fault is returned) are stored in an exception table 1022 (step 950).

Figure 11:
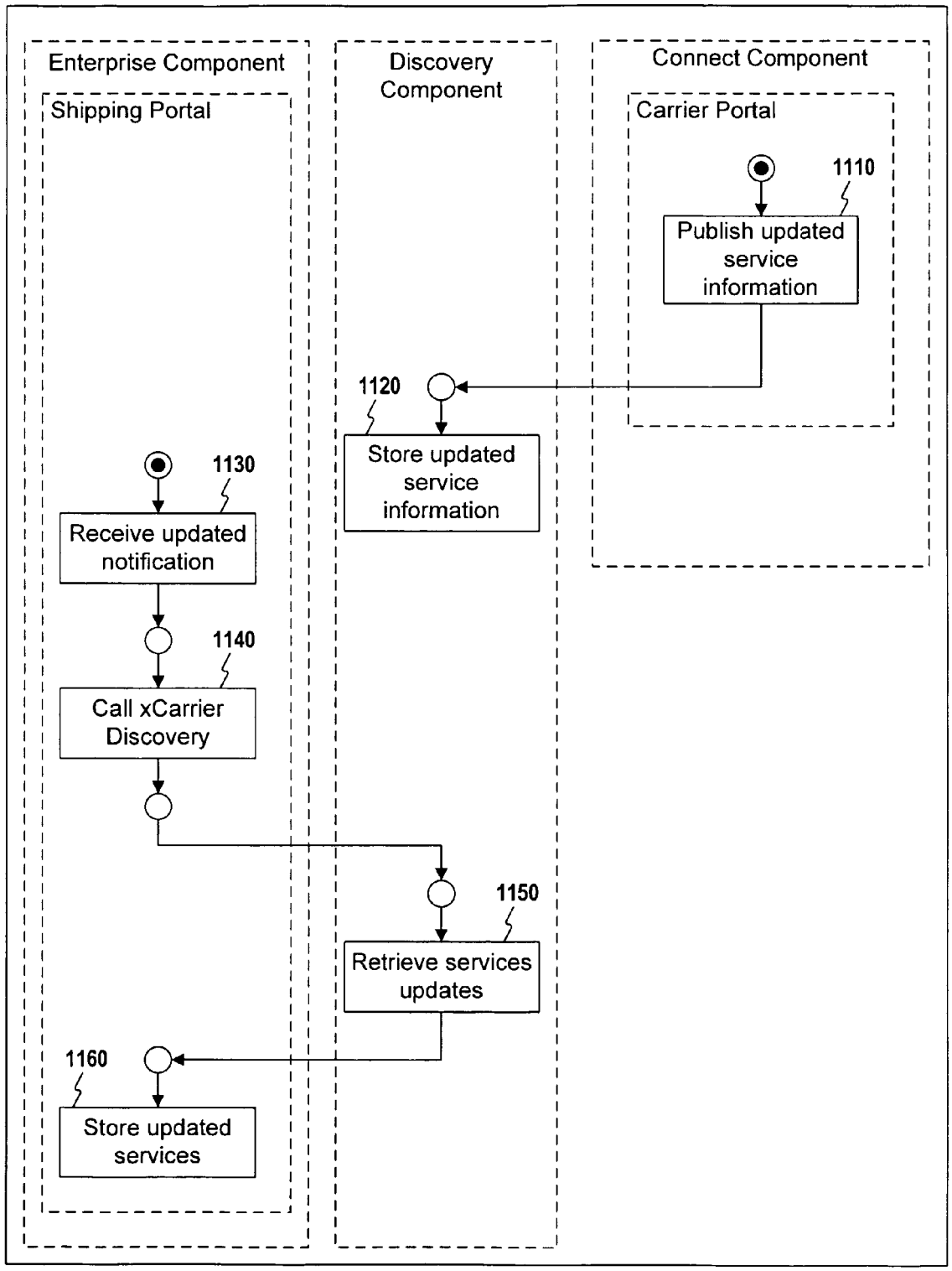
FIG. 11 illustrates a block diagram of an exemplary operation of the update procedure of FIG. 3, consistent with an embodiment of the present invention.
Figure 12:
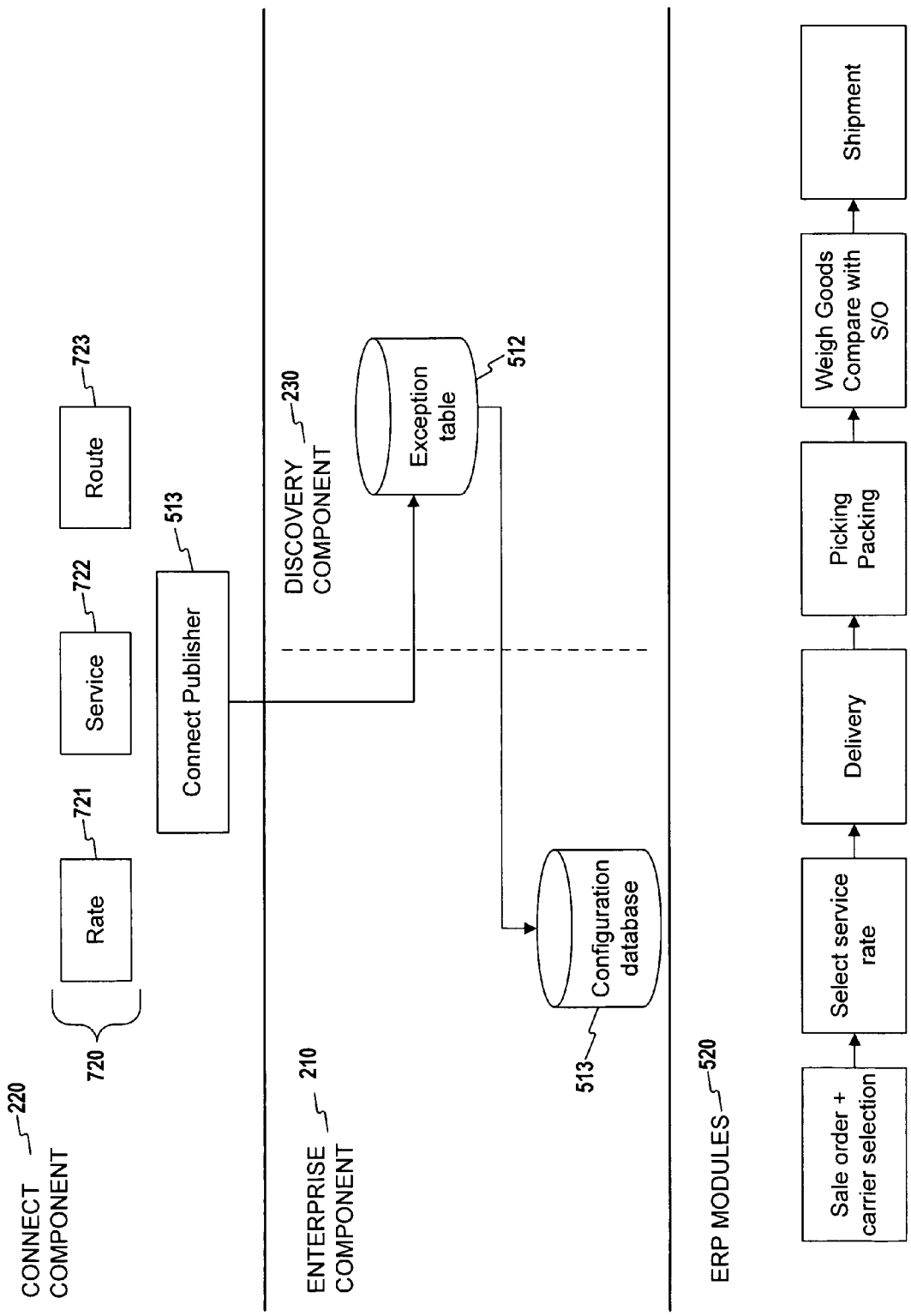
FIG. 12 illustrates a block diagram of exemplary elements and their interaction within the update procedure, consistent with an embodiment of the present invention.

FIG. 11 illustrates a sequence diagram of an exemplary overall execution of the update procedure 350 as previously discussed in FIG. 3. FIG. 12 illustrates a block diagram of exemplary elements and their interaction within the procedure. Discussion of the update procedure 350 will relate to both FIGS. 11 and 12. The update procedure 350 handles all possible updates occurring while using the integration platform. In particular, there are two types of updates: the carrier update which deals with updating carrier specific information (e.g., information update for enterprises) and the service update which deals with updating information for a service that is already used by the shipper. This update may be triggered by the carrier (e.g., if new routing tables are available) or requested by the shipper.

From the view of the enterprise, the shipping manager has the possibility to update composed services and orchestrated business processes. This may either be triggered by the shipping manager who looks for new carriers/services or by the carrier who has updated the service description in the discovery component 230 and notified the shipping manager. Testing will not be needed anymore, since the information posted is compliant with the integration platform and may simply be downloaded. From the view of the carrier, the posting of updates to the integration platform will ensure the distribution to all enterprises and also the timely installation of the update. The carrier will be able to monitor the download status and, if needed, send reminders to the enterprises.

As illustrated, the service update process 350 may be initiated by the carrier publishing, through the connect publisher 511, updated service information (step 1110). Specifically, the updates are stored in discovery database 512 and the carrier tracks the download progress of the update (step 1120). As a result of the publishing, a notification is received at the shipping portal 601 that an update is available (step 1130). A user may click on the notification to initiate the download process. The download process begins by a call to the discovery component 230 (step 1140) and the relevant update is retrieved from the discovery database 512 for downloading (step 1150). The update download is started and the new information is stored in the configuration database 513 (step 1160). Testing is not required since the information is downloaded and is compliant with the integration platform.

CONCLUSION

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, while the embodiments as disclosed relate to the order-to-cash process and the integration of carrier services into this process, one skilled in the art would realize that the principles of the invention are applicable to other enterprise scale business scenarios and the vendors who provide services to support these scenarios. An example of another type of enterprise scale business scenario is the procurement process for obtaining raw materials or other goods from vendors. In this example, various services may be provided by vendors that may benefit from integration with the ERP system of an enterprise.

Further, the described implementations include software, but systems and methods consistent with the present invention may be implemented as a combination of hardware and software or in hardware alone. Examples of hardware include computing or processing systems, including personal computers, servers, laptops, mainframes, micro-processors and the like. Additionally, although aspects of the invention are described for being stored in memory, one skilled in the art will appreciate that these aspects may also be stored on other types of computer-readable media, such as secondary storage devices, for example, hard disks, floppy disks, or CD-ROM, the Internet or other propagation medium, or other forms of RAM or ROM.

Computer programs based on the written description and methods of this invention are within the skill of an experienced developer. The various programs or program modules may be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules may be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. An integration platform for integrating carrier services with an enterprise-scale business process that is supported by modules of an enterprise resource planning (ERP) system of an enterprise, comprising:

a discovery component including a processor that provides general Web services, which perform functions related to the enterprise-scale business process, and specific Web services, which perform functions of a Web service offered by a specific carrier, wherein the general Web services are provided by a third party different from the enterprise and the carrier;

a connect component including a processor, provided by at least one of a plurality of carriers, that publishes specific Web services, which perform functions of a Web service offered by the carrier to the discovery component, wherein the functions performed by the specific Web services offered by the carrier include ordering information related to a product offered by the enterprise; and an enterprise component including a processor, deployed by the enterprise, that:
receives a request to discover a specific Web service,
sends the request to the discovery component,
retrieves, in response to the sending of the request, a specific Web service published by the connect component, wherein the retrieval of the specific Web service includes querying the requested service from the connect component and other connect components,
combines a general Web service with the retrieved specific Web service into an enterprise service, wherein the combined enterprise service is represented by a composition definition defining Web service calls stored in a database table and processed by a service,
activates, within the ERP system, the enterprise service,
invokes the enterprise service, and
executes the general Web service and the selected specific Web service to obtain the ordering information related to the product offered by the enterprise.

2. The integration platform of claim 1, wherein the enterprise-scale business process is an order-to-cash process.

3. The integration platform of claim 1, wherein the enterprise component retrieves only the specific Web services for which it has been granted authorization.

4. The integration platform of claim 1, wherein the enterprise and connect components comprise an integration and application platform and a business process platform wherein the integration and application platform provides, through the business process platform, a foundation upon which modules that comprise the enterprise-scale business process within the ERP system are run.

5. The integration platform of claim 4, wherein the enterprise, connect, and discovery components are connected through the use of an integration broker that runs within the integration and application platform.

6. The integration platform of claim 4, wherein the discovery component is further adapted to enable the discovery of carriers and their services.

7. A method of developing an integration platform for integrating carrier services with an enterprise-scale business process that is supported by modules of an enterprise resource planning (ERP) system of an enterprise, comprising:
providing, using a discovery component which includes a processor, general Web services, which perform functions related to the enterprise-scale business process, and specific Web services, which perform functions of a Web service offered by a specific carrier, wherein the general Web services are provided by a third party different from the enterprise and the carrier;
publishing, using a connect component which includes a processor provided by at least one of a plurality of carriers, specific Web services, which perform functions of a Web service offered by the carrier of the vendor to the discovery component, wherein the functions performed by the specific Web services offered by the carrier include ordering information related to a product offered by the enterprise; and
using an enterprise component which includes a processor deployed by the enterprise to:
receive a request to discover a specific Web service,
send the request to the discovery component,
retrieve, in response to the sending of the request, a specific Web service published by the connect, wherein the retrieval of the specific Web service includes querying the requested service from the connect component and other connect components,
combine a general Web service with the retrieved specific Web service into an enterprise service, wherein the combined enterprise service is represented by a composition definition defining Web service calls stored in a database table and processed by a service,
activate, within the ERP system, the enterprise service,
invoke the enterprise service, and
execute the general Web service and the selected specific Web service to obtain the ordering information related to the product offered by the enterprise.

8. The method of claim 7, wherein the enterprise-scale business process is an order-to-cash process.

9. The method of claim 7, wherein the enterprise component retrieves only the specific Web services for which it has been granted authorization.

10. The method of claim 7, wherein the enterprise and connect components comprise an integration and application platform and a business process platform wherein the integration and application platform provides, through the business process platform, a foundation upon which modules that comprise the enterprise-scale business process within the ERP system are run.

11. The method of claim 10, wherein the enterprise, connect, and discovery components are connected through the use of an integration broker that runs within the integration and application platform.

12. The method of claim 10, wherein the enterprise component plugs the Web services into an order-to-cash business process of the enterprise using specified plug in points of said modules and combines the Web services or Web service calls into one enterprise service.

13. A non-transient computer-readable storage medium including program instructions for performing, when executed by a processor, a method of developing an integration platform for integrating carrier services with an enterprise-scale business process that is supported by an enterprise resource planning (ERP) system of an enterprise, the method comprising:
providing, using a discovery component, general Web services, which perform functions related to the enterprise-scale business process, and specific Web services, which perform functions of a Web service offered by a specific carrier, wherein the general Web services are provided by a third party different from the enterprise and the carrier;
publishing, using a connect component provided by at least one of a plurality of carriers, specific Web services, which perform functions of a Web service offered by the carrier of the vendor to the discovery component, wherein the functions performed by the specific Web services offered by the carrier include ordering information related to a product offered by the enterprise; and
using an enterprise component deployed by the enterprise to:
receive a request to discover a specific Web service,
send the request to the discovery component,
retrieve, in response to the sending of the request, a specific Web service published by the connect component, wherein the retrieval of the specific Web service includes querying the requested service from the connect component and other plurality of connect components,
combine a general Web service with the retrieved specific Web service into an enterprise service, wherein the combined enterprise service is represented by a composition definition defining Web service calls stored in a database table and processed by a service, activate, within the ERP system, the enterprise service, invoke the enterprise service, and execute the general Web service and the selected specific Web service to obtain the ordering information related to the product offered by the enterprise.

14. The method of claim 13, wherein the enterprise-scale business process is an order-to-cash process.

15. The method of claim 13, wherein the enterprise component retrieves only the specific Web services for which it has been granted authorization.

16. The method of claim 13, wherein the enterprise and connect components comprise an integration and application platform and a business process platform wherein the integration and application platform provides, through the business process platform, a foundation upon which modules that comprise the enterprise-scale business process within the ERP system are run.

17. The method of claim 16, wherein the enterprise, connect, and discovery components are connected through the use of an integration broker that runs within the integration and application platform.

* * * * *